US005273808A

United States Patent [19]

Mano et al.

[11] Patent Number: 5,273,808

[45] Date of Patent: Dec. 28, 1993

[54] THERMAL TRANSFER RECORDING MEDIUM

[75] Inventors: Shigeru Mano; Sota Kawakami; Kouji Nishizaki; Harue Ebisawa, all of Hino, Japan

[73] Assignee: Konica Corporation, Japan

[21] Appl. No.: 586,680

[22] Filed: Sep. 24, 1990

[30] Foreign Application Priority Data

Sep. 29, 1989 [JP] Japan ........ 1-254541
Jan. 17, 1990 [JP] Japan ........ 2-7818

[51] Int. Cl.[5] ........ B32B 9/00

[52] U.S. Cl. ........ 428/195; 428/336; 428/473.5; 428/484; 428/488.1; 428/488.4; 428/913; 428/914

[58] Field of Search ........ 428/195, 484, 488.4, 428/488.1, 336, 913, 914

[56] References Cited

U.S. PATENT DOCUMENTS 4,461,586 7/1984 Kawanishi et al. ........ 428/488.1
4,681,796 7/1987 Maehashi et al. ........ 428/212
4,777,079 10/1988 Nagamoto ........ 428/195
4,780,391 10/1988 Hiraishi et al. ........ 428/195
4,818,591 4/1989 Kitamura et al. ........ 428/216
4,857,384 8/1989 Mio et al. ........ 428/164
4,875,961 10/1989 Oike ........ 428/195
4,914,079 4/1990 Takei ........ 428/195

OTHER PUBLICATIONS

Database WPIL, No. 89-169337, Derwent Publications, London, JPA-1-110528; Apr. 27, 1989.
Patent Abstracts of Japan, vol. 9, No. 187(M-401)(1910); Aug. 3, 1985 JPA-60-54893; Mar. 29, 1985.
Patent Abstracts of Japan, vol. 10, No. 100 (M-470)(2157); Apr. 16, 1986 JPA-60-236787; Nov. 25, 1985.
Patent Abstracts of Japan, vol. 13, No. 90(M-803)(3438); Mar. 2, 1989 JPA-63-281888; Nov. 18, 1988.
Patent Abstracts of Japan, vol. 13, No. 310(M-850)(3658); Jul. 14, 1989 JPA-1-97684; Apr. 17, 1989.

*Primary Examiner*—Patrick J. Ryan
*Assistant Examiner*—W. Krynski
*Attorney, Agent, or Firm*—Jordan B. Bierman

[57] ABSTRACT

There is disclosed a thermal transfer recording medium having excellent resistance to solvent, heat and rubbing. The recording medium has a transfer layer consisting of plural layers and at least one of the plural layers contains a thermoplastic resin having a glass transition point of 120° C. or higher.

5 Claims, 1 Drawing Sheet

THERMAL TRANSFER RECORDING MEDIUM

FIELD OF THE INVENTION

The present invention relates to a thermal transfer recording medium, more specifically to a thermal transfer recording medium usable for such applications as printing of bar codes, in which excellent resistance to solvent, rubbing and heat is required.

BACKGROUND OF THE INVENTION

A conventional thermal transfer recording medium comprises a support having thereon a transfer layer primarily consisting of a wax, a thermoplastic resin and a colorant.

The thermal transfer medium has come to be widely used because of its easier printing and better quality of printed images.

Recently, a variety of characters, FIGURES and marks such as bar codes are printed on articles and packaging materials with the thermal transfer recording medium.

Such printed articles and packaging materials are exposed to various work environments in the course of transportation, storage and packaging; they have many chances to contact various solvents, chemicals or oil in a factory, or to be occasionally placed near a heat source, and the printed matters are sometimes so badly affected that they are faded or blurred.

The thermal transfer recording medium used under such work environments are required to have much higher resistance to solvent and heat.

In a conventional thermal transfer recording medium, the transfer layer is primarily composed of a wax and a thermoplastic resin having a glass transition point (Tg) below 120° C. in order to control peeling of a colorant layer from a support and lower break thereof when heat is applied. The recording medium containing a thermoplastic resin with a glass transition point of 120° C. or higher has been considered to supposedly have difficulty in achieving the above matters.

On the other hand, a conventional thermal transfer medium has a problem of poor resistance to heat and chemicals.

SUMMARY OF THE INVENTION

The object of the present invention is to provide a heat transfer recording medium capable of forming printed images having excellent resistance to heat and chemicals.

The above object of the invention can be achieved by a heat transfer recording medium comprising a support and provided thereon a transfer layer consisting of plural layers, wherein at least one of the above layers contains a thermoplastic resin having a glass transition point of 120° C. or higher.

Figure 1:
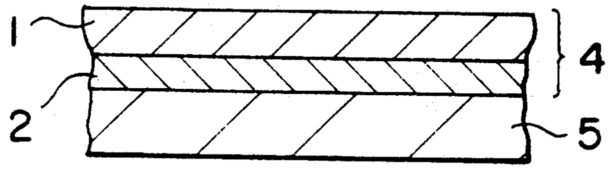
FIGS. 1 and 2 are the cross-sections showing the embodiments of the invention.

1: First layer, a colorant layer
2: Second layer, a protective layer
*1a:* First layer, a colorant layer 1
*2a:* Second layer, a colorant layer 2
*3a:* Third layer, a peeling layer
4: Transfer layer
5: Support.

DETAILED DESCRIPTION OF THE INVENTION

Transfer layer (1) A thermoplastic resin having a glass transition point (Tg) of 120° C. or above (hereinafter referred to as the resin according to the invention)

It is essential in the present invention that at least one layer in the transfer layer contains the resin according to the invention as a main component.

The examples of the foregoing resin are cellulose tributylate (Tg: 120° C.), cellulose-2,6-butylate (Tg: 125° C.), cellulose triacetates (Tg: 120, 155° C.), polyamide prepared from heptamethylenediamine and terephthalic acid (Tg: 123° C.), polyamide prepared from fluorene dipropylamine and adipic acid (Tg: 120° C.), polyamide prepared from hexamethylenediamine and diphenic acid (Tg: 127° C.), polyamide prepared from m-xylenediamine and diphenic acid (Tg: 159° C.), polyamide prepared from piperazine and diphenic acid (Tg: 193° C.), polyamide prepared from fluorene dipropylamine and diphenic acid (Tg: 165° C.), polyamide prepared from hexamethylenediamine and isophthalic acid (Tg: 130° C.), polyamide prepared from m-xylenediamine and isophthalic acid (Tg: 165° C.), polyamide prepared from piperazine and isophthalic acid (Tg: 192° C.), polyamide prepared from fluorene dipropylamine and isophthalic acid (Tg: 175° C.), polyamide prepared from hexamethylenediamine fluorene and dipropionic acid (Tg: 122° C.), polyamide prepared from m-xylenediamine fluorene and dipropionic acid (Tg: 150° C.), polyamide prepared from piperazine fluorene and dipropionic acid (Tg: 145° C.), polyamide prepared from fluorene dipropylamine and fluorene dipropionic acid (Tg: 165° C.), polyanhydrides (Tg: 120° to 150° C.), polycarbonates (Tg: 120° to 150° C.), polycarbonate prepared from bisphenol A (Tg: 147° C.), polysulfone (Tg: 189° C.), poly-2-cyanoethyl methacrylate (p-cyanophenyl) (Tg: 155° C.), poly-2-cyanoethyl methacrylate (p-cyanoethylphenyl) (Tg: 128° ±3° C.), polyethylene glycol dimethacrylate (Tg: 132° C.), polyacrylochloroacrylate (methyl) (Tg: 140° C.), polyacrylate (pentachlorophenyl) (Tg: 145° C.), p-carboxymethoxy polystyrene (Tg: 131° C.), p-cyano polystyrene (Tg: 120° C.), o-methyl polystyrene (Tg 125° C.), 2,4-dimethyl polystyrene (Tg: 129° C.), 2,5-dimethyl polystyrene (Tg: 122° C.), p-tert-butyl polystyrene (Tg: 131° C.), p-phenyl polystyrene (Tg: 135° C.), p-chloro polystyrene (Tg:128° C.), 3,4-dichloro polystyrene (Tg: 138° C.), 2,6-dichloro polystyrene (Tg: 167° C.), α-vinylnaphthalene polystyrene (Tg: 162° C.), α-methylnaphthalene polystyrenes (Tg: 180°, 192°, 150° C.), polyimide, aromatic polyester (Tg: 120° C), polyarylate prepared from bispherol A and terephthalic acid (Tg: 193° C.), polyvinyl chloride (Tg: 125° C.) and polyvinyl acetate (Tg: 120° C.).

Of the foregoing thermoplastic resins, preferable ones are polypentachlcrophenyl acrylate, poly-p-tert-butylstyrene, polyimide, polyarylate and cellulose triacetate.

Besides the forgoing resins, example of the thermoplastic resin preferably used in the present invention is a polyparabanic acid resin represented by the following Formula 1:

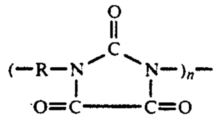

wherein R typically represents

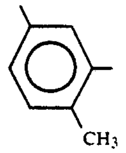

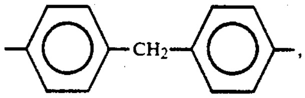,

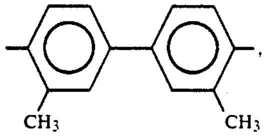, 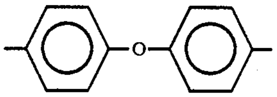

and $-(CH_2)_6-$; and n represents the number of repetitive units.

(2) Layer constitution of the transfer layer

The transfer layer of the invention is peeled from the support and transferred to a recording material to form printed images thereon.

The transfer layer of the invention consists of plural layers including a colorant layer and a peeling layer.

In the invention, the resin according to the invention including a polyparabanic acid resin is incorporated into at least one of the layers constituting the transfer layer, preferably into the uppermost layer.

FIG. 1 shows one example of a layer structure, in which the transfer layer 4 comprising the second layer 2 and the first layer 1 is formed on the support 5 in sequence. The second layer 2 is a protective layer and the first layer 1 is a colorant layer.

The resin according to the invention is incorporated into the protective layer 2, and thereby resistance to heat and chemicals of transferred print images is improved.

Beside the resin according to the invention, the protective layer may contain a fusible material, a thermoplastic resin having a glass transition point of 120° C. or below, a variety of additives, and a colorant.

The examples of the fusible material are vegetable waxes such as carnauba wax, Japanese wax, auriculae wax and esparto wax; animal waxes such as beeswax, insect wax, shellac wax and spermaceti; petroleum waxes such as paraffin wax, microcrystalline wax, polyethylene wax, ester wax and oxidized wax; and mineral waxes such as montan wax, ozokerite and ceresine. In addition to these waxes, the examples include higher fatty acids such as palmitic acid, stearic acid, margaric acid and behenic acid; higher alcohols such as palmityl alcohol, stearyl alcohol, behenyl alcohol, marganyl alcohol, myricyl alcohol and eicosanol; higher fatty esters such as cetyl palmitate, myricyl palmitate, cetyl stearate and myricyl stearate; amides such as acetamide, propionic amide, palmitic amide, stearic amide and amide wax; and higher amines such as stearyl amine behenyl, amine and palmityl amine.

These substances may be used singly or in combination.

Among them, preferred are waxes having melting points ranging from 50° to 150° C.

The examples of the thermoplastic resin having a glass transition point of 120° C. or below are resins such as ethylene copolymer, polyamide, polyester, polyurethane, polyolefin, acrylic resin, vinyl chloride resin, cellulose resin, rosin resin, ionomer resin and petroleum resin; elastomers such as natural rubber, styrene-butadiene rubber, isoprene rubber, chloroprene rubber and ethylene-acrylic ester rubber; rosin derivatives such as ester gum, rosin-maleic acid resin, rosin-phenol resin and hydrogenated rosin; and polymers having a softening point of 50° to 150° C. such as phenol resin, terpene resin, cyclopentadiene resin and aromatic hydrocarbon resin.

These materials may be used singly or in combination.

Further, the protective layer may contain a surfactant such as a polyoxyethylene compound in order to adjust a peeling property.

The examples of the other additives for the protective layer are silica, talc, calcium carbonate, carbon black, alumina, acid clay, clay, magnesium carbonate, tin oxide, titanium white, graphite, thermosetting resin powder, fluorinated powder, melamine resin powder, urea resin powder, benzoguanamine resin powder, acrylic resin powder, styrene resin powder, boron nitride, copper, iron, aluminum, iron oxide, magnesium oxide and titanium nitride.

The examples of the colorants contained in the colorant layer are pigments such as inorganic pigments and organic pigments, and dyes.

The examples of the inorganic pigment are titanium dioxide, carbon black, zinc oxide, Prussian blue, cadmium sulfide and iron oxide.

The examples of the organic pigment are pigments of azo type, thioindigo type, anthraquinone type, anthoanthrone type and triphenodioxazine type; vat dye pigments; phthalocyanine pigments such as copper phthalocyanine and its derivatives; and quinacridone pigments.

The examples of the dye are acid dyes, direct dyes, dispersion dyes, oil-soluble dyes and metal-containing oil-soluble dyes.

The protective layer can be formed by the hot-melt coating method, the aqueous coating method or the method that uses an organic solvent.

Generally, the colorant layer is composed of a colorant, a fusible substance, a thermoplastic resin and various additives, each of which is the same material as described in the protective layer.

A content of the colorant in the colorant layer is normally 5 to 95 wt %, preferably 10 to 65 wt %.

A thickness of the colorant layer is normally 0.5 to 10 μm, preferably 0.5 to 6 μm.

The colorant layer can be formed by the same methods as in the protective layer.

Figure 2:
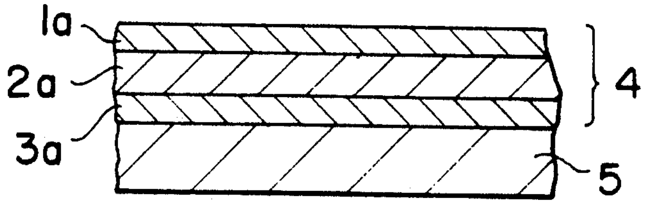

FIG. 2 shows another example of the transfer layer of the invention, in which there is provided on the support 5 in sequence the transfer layer 4 comprising the third layer 3a, the second layer 2a and the first layer 1a.

The colorant may be contained in any one of the layers 1a, 2a and 3a, and these three layers contain a thermoplastic resin and a fusible material. These thermoplastic resin, fusible material and colorant are the same as those described above.

The resin according to the invention is incorporated into at least one of the layers 1*a*, 2*a* and 3*a*.

The third layer 3*a* adjacent to the support 5 has a function to adhere to the support 5 with a moderate adhesion and to be peeled off well from support when printing.

It is possible to make the layer 3*a* the peeling layer by adding a large amount of wax or a less amount of the resin according to the invention than in the layer 2*a*.

The peeling function of the layer 3*a* can be controlled by incorporating therein a silicone oil or wax.

The adhesive function of the peeling layer can be controlled by incorporating therein an ethylene-vinyl acetate copolymer.

The peeling layer may contain a surfactant such as a polyoxyethylene compound, and a silicone compound to adjust the peeling property.

Further, the peeling layer may contain other additives such as silica, talc, calcium carbonate, carbon black, alumina, acid clay, clay, magnesium carbonate, tin oxide, titanium white, graphite, thermosetting resin powder, fluorinated resin powder, melamine resin powder, urea resin powder, benzoguanamine resin powder, acrylic resin powder, styrene resin powder, boron nitride, copper, iron, aluminum, iron oxide, magnesium oxide and titanium nitride.

An amount of each compound contained in the peeling layer is adjusted so that the peeling layer can have the peeling function balanced with the adhesive function.

A thickness of each layer is normally 0.5 to 10 μm, preferably 0.5 to 6 μm.

In the transfer layer of the invention, an adhesive layer or an anti-sticking layer may be formed on the foregoing colorant layer.

In the present invention, it is desirable that the support possess high dimensional stability as well as good resistance to heat and solvent.

The examples of the material for the support are papers such as plain paper, condenser paper, laminated paper and coated paper; resin films made of polyethlene, polyethylene terephthalate, polysulfone, polystyrene, polypropylene and polyimide; paper laminated with resin film; and resin film or resin sheets on which a metal such as aluminum is deposited by evaporation.

A thickness of the support is normally less than 30 μm, preferably 2 to 12 μm. The thickness less than 30 μm will improve heat conductivity and printing quality.

A backing layer may be provided.

a subbing layer may be interposed between the support and the transfer layer.

The thermal transfer recording medium thus prepared is normally used in a wide tape for a line printer or a ribbon for a typewriter.

EXAMPLES

The present invention is hereunder described in more detail by referring to the examples and drawings.

Example 1

On a polyethylene terephthalate film support having a thickness of 4.5 μm were formed a protective layer having a thickness of 1.0 μm (the second layer) and a colorant layer having a thickness of 2.0 μm (the first layer) by the solvent coating method to prepare a thermal transfer recording medium with a layer constitution shown in FIG. 1. Composition of each layer was as follows:

| | |
|---|---|
| Composition for the protective layer | |
| Polypentachlorophenyl acrylate (Tg: 145° C.) | 90% |
| EVA resin | 10% |
| EV 310 made by Mitsui Du Pont Ltd. (Ethylene-vinyl acetate copolymer, softening point: ≦40° C.) | |
| Composition for the colorant layer | |
| Carbon black | 20% |
| MA 30 made by Mitsubishi Kasei Corp. | |
| Polyester | 15% |
| Vylon 200 (Polyester resin, Tg: 67° C.) | |
| EVA resin | 15% |
| EV 310 made by Mitsui Du Pont Ltd. | |
| Wax | 50% |
| HNP-10 made by Nippon Seiro Ltd. (Paraffin wax, Mp: 75° C.) | |

EXAMPLE 2

Example 1 was repeated except that the thicknesses of the protective and colorant layers were changed to 2.0 and 1.0, respectively and that the composition of the protective layer was changed as shown below.

| Composition of the protective layer | |
|---|---|
| Poly-p-tert-butylstyrene (Tg: 131° C.) | 95% |
| Polyester | 5% |
| UE 3600 made by Unitika Ltd. (Polyester resin, Tg: 75° C.) | |

EXAMPLE 3

Example 1 was repeated except that the composition of the protective layer (thickness: 0.5 μm) was changed as shown below:

| Composition of the protective layer | |
|---|---|
| Cellulose triacetate (Tg: 155° C) | 65% |
| Polyurethane | 35% |
| Nipporan 3107 made by Nippon Polyurethane Ltd. (Polyurethane, Tg: ≦0° C.) | |

EXAMPLE 4

Example 1 was repeated except that the compositions of the protective layer (thickness: 2.0 μm) and the colorant layer (thickness: 0.5 μm) were changed shown below, respectively.

| | |
|---|---|
| Composition of the protective layer | |
| Carbon black | 20% |
| Polyarylate (Tg: 193° C) | 65% |
| EVA resin | 15% |
| Composition of the colorant layer | |
| Carbon black | 20% |
| Polyester | 30% |
| EVA resin | 15% |
| Polystyrene | 30% |
| Wax | 5% |

COMPARISON 1

Example 1 was repeated except that polypentachlorophenyl acrylate used in the protective layer was replaced with wax HNP-10.

COMPARISON 2

Example 2 was repeated except that poly-p-tert-butylstyrene used in the protective layer was replaced with wax HNP-10.

COMPARISON 3

Example 3 was repeated except that cellulose triacetate used in the protective layer was replaced with EVA EV-310.

COMPARISON 4

Example 4 was repeated except that polyarylate used in the protective layer was replaced with wax HNP-10.

The thermal transfer recording media samples prepared as the above were subjected to printing on plain paper with a thermal printer Model B-30 made by Tokyo Kenki Ltd. The printed images were subjected to the following evaluation:

Resistance to solvent

A printed image (a bar code) was rubbed with cotton cloth (Sofpad) soaked with toluene, xylene, gasoline or rust preventive oil under a load of 500 g/cm$^2$ and at a speed of 20 cm/sec, and legibility of the rubbed image was tested with a bar code reader to determine solvent resistance:

○: legible
×: illegible

Heat resistance test (1)

An image printed on plain paper and covered with cotton boradcloth #40 was rubbed ten times thereon with an iron of 180° C. under a load of a 5 kg to visually observe transfer of printed images on the cotton cloth.

○: no transfer observed
×: transfer observed

Heat resistance test (2)

A printed image (a bar code) was rubbed ten times with fine paper at 100° C. under a load of 500 g/cm$^2$, and legibility of the rubbed image was tested with a bar code reader:

○: legible
×: illegible

Quality of printed images

The images printed on plain paper with a thermal printer Model B-30 made by Tokyo Denki Ltd were visually observed if a break could be found on a printed line of 0.25 mm width:

○: no break
×: breaks observed

EXAMPLE 5

On a 4.5 μm thick polyethylene terephthalate film support were formed a 0.5 μm thick colorant layer 1, a 2.0 μm thick colorant layer 2 and a 0.3 μm thick peeling layer by the solvent coating method to prepare a thermal transfer recording medium having a layer constitution shown in FIG. 2. Composition of each layer was as follows:

| | |
|---|---|
| Composition of the colorant layer 1 | |
| Carbon black | 20% |
| MA 30 made by Mitsubishi Kasei Corp. | |
| Polyester | 30% |
| UE 3200 made by Unitika Ltd. | |
| (Polyester resin, Tg: 65° C.) | |
| EVA resin | 15% |
| EV 40Y made by Mitsui Du Pont Ltd. | |
| (Ethylene-vinyl acetate copolymer, | |
| softening point: ≦40° C.) | |
| Carnauba wax | 35% |
| Composition of the colorant layer 2 | |
| Carbon black | 20% |
| Polyimide (Tg: 145° C.) | 65% |
| EVA resin | 15% |
| EV 310 made by Mitsui Du Pont Ltd. | |
| Composition of the peeling layer | |
| Paraffin wax HNP-3 (m.p. 65° C.) | 95% |
| EVA resin | 5% |
| EV 210 made by Mitsui Du Pont Ltd. | |
| (Ethylene-vinyl acetate copolymer, | |
| softening point: ≦40° C.) | |

EXAMPLE 6

Example 5 repeated except that the compositions of the colorant layer 2 (thickness: 1 μm) and the peeling layer (thickness: 1 μm) were changed as shown below.

| | |
|---|---|
| Composition of the colorant layer 2 | |
| Carbon black | 20% |
| Polypentachlorophenyl acrylate (Tg: 145° C.) | 80% |
| Composition of the peeling layer | |
| Carbon black | 20% |
| Polypentachlorophenyl acrylate | 70% |
| EVA resin | 10% |
| EV 210 made by Mitsui Du Pont Ltd. | |

Example 5 was repeated except that polyimide was removed from the colorant layer 2.

TABLE 1

| | Resin according to the invention | Solvent resistance test: Toluene Rubbing times 1 | 2 | 3 | Xylene Rubbing times 1 | 2 | 3 | Gasoline Rubbing times 2 | 5 | 10 | 20 | Rust preventive oil Rubbing times 10 | 20 | Heat resistance test (1) | (2) | Quality of printed images |
|---|---|---|---|---|---|---|---|---|---|---|---|---|---|---|---|---|
| Example 1 | Polypentachlorophenyl acrylate | o | o | o | o | o | o | o | o | o | o | o | o | o | o | o |
| Example 2 | Poly-p-tert-buthyl styrene | o | o | o | o | o | o | o | o | o | o | o | o | o | o | o |
| Example 3 | Cellulose triacetate | o | o | o | o | o | o | o | o | o | o | o | o | o | o | o |
| Example 4 | Polyarylate | o | o | o | o | o | o | o | o | o | o | o | o | o | o | o |
| Comparison 1 | — | x | — | — | x | — | — | o | x | — | — | x | — | x | x | o |
| Comparison 2 | — | x | — | — | x | — | — | o | x | — | — | x | — | x | x | o |
| Comparison 3 | — | x | — | — | x | — | — | o | x | — | — | x | — | x | x | o |
| Comparison 4 | — | x | — | — | x | — | — | o | x | — | — | x | — | x | x | o |

COMPARISON 6

Example 6 was repeated except that polypentachlorophenyl acrylate used in the colorant layer 2 and the peeling layer was replaced with EVA resin EV 310 and wax HNP-3 (made by Nippon Siero, Paraffin Wax, Tg: 65° C.).

The thermal transfer recording media samples prepared as above were evaluated in the same manner as in Example 1. The results are shown in Table 2.

TABLE 2

| | Resin according to the invention | Solvent resistance test: Toluene Rubbing times 1 | 2 | 3 | Trichlene Rubbing times 1 | 2 | Gasoline Rubbing times 2 | 5 | 10 | 20 | Rust preventive oil Rubbing times 10 | 20 | Heat resistance test (1) | (2) | Quality of printed images |
|---|---|---|---|---|---|---|---|---|---|---|---|---|---|---|---|
| Example 5 | Polyimide | o | o | o | o | o | o | o | o | o | o | o | o | o | o |
| Example 6 | Polypentachlorophenyl acrylate | o | o | o | o | o | o | o | o | o | o | o | o | o | o |
| Comparison 5 | — | x | — | — | x | — | o | x | — | — | x | — | x | x | o |
| Comparison 6 | — | x | — | — | x | — | o | x | — | — | x | — | x | x | o |

What is claimed is:

1. A thermal transfer recording medium comprising a support having provided thereon a transfer layer comprising a plurality of different layers containing a colorant and a fusible material, at least one of the layers further comprising a thermoplastic resin having a glass transition point of at least 120° C., said thermoplastic resin being selected from the group consisting of polypentachlorophenyl acrylate, poly-p-tert-butylstyrene, polyimide, polyarylate, cellulose triacetate, and polyparabanic acid represented by the following formula:

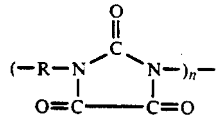

wherein R represents:

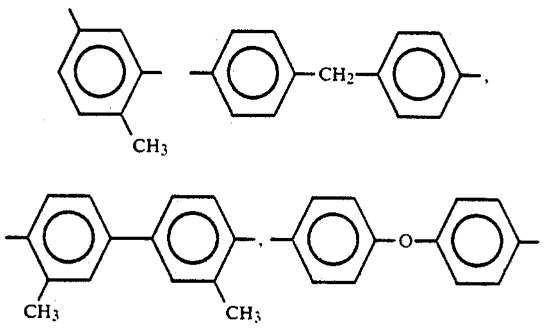

$-(-CH_2-)_6-$ and n is the number of repetitive units.

2. The recording medium of claim 1, wherein the thermoplastic resin 1 is polyparabanic acid.

3. The recording medium of claim 1, wherein the thermoplastic resin 1 is added to the uppermost layer.

4. The recording medium of claim 1, wherein each of the plural layers has a thickness of 0.5 to 10 μm.

5. The recording medium of claim 4, wherein the thickness is 0.5 to 6 μm.

* * * * *